US008508670B2

(12) United States Patent
Dai et al.

(10) Patent No.: US 8,508,670 B2
(45) Date of Patent: Aug. 13, 2013

(54) ELECTRONIC DEVICE AND METHOD OF CHANNEL MANAGEMENT

(75) Inventors: Lung Dai, Taipei Hsien (TW); Yan-Hu Sun, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 197 days.

(21) Appl. No.: 12/899,559

(22) Filed: Oct. 7, 2010

(65) Prior Publication Data

US 2011/0141378 A1 Jun. 16, 2011

(51) Int. Cl.
*H04N 5/44* (2011.01)

(52) U.S. Cl.
USPC .......................................... 348/734; 348/731

(58) Field of Classification Search
USPC .................. 348/731–734, 553–559; 725/38, 725/47, 50
See application file for complete search history.

(56) References Cited

U.S. PATENT DOCUMENTS

| 6,934,917 | B2 * | 8/2005 | Lin ................................. 715/811 |
| 7,193,661 | B2 * | 3/2007 | Dresti et al. ................... 348/734 |
| 7,546,620 | B2 * | 6/2009 | Takagi et al. .................... 725/38 |
| 7,610,010 | B2 * | 10/2009 | Onomatsu et al. ........... 455/3.01 |

* cited by examiner

*Primary Examiner* — Michael Lee
(74) *Attorney, Agent, or Firm* — Altis Law Group, Inc.

(57) ABSTRACT

An electronic device and a channel management method provide a predetermined channel information table to control channels in a television. Favorite channels are stored in the predetermined channel information table of the electronic device. In a predetermined channel mode, if an input channel code is not stored in the predetermined channel information table, the electronic device automatically adds the input channel code to the predetermined channel information table. If the input channel code is stored in the predetermined channel information table, the electronic device transfers the input channel code to the television and the television changes an active channel accordingly.

10 Claims, 4 Drawing Sheets

| Channel code | Channel |
|---|---|
| 1234 | Central TV |
| 1122 | Carton Channel |
| 2154 | Nature Channel |
| 3521 | Sport Channel |
| | |

FIG. 3

ELECTRONIC DEVICE AND METHOD OF CHANNEL MANAGEMENT

BACKGROUND

1. Technical Field

Embodiments of the present disclosure relate to channel management, and more particularly to an electronic device and a method of channel management.

2. Description of Related Art

While widely used, with growing availability of device features, TV remote controls have developed to presenting an increased plurality of controls, with confusion and difficulty of operation the frequent result.

BRIEF DESCRIPTION OF THE DRAWINGS

FIG. 3 is a schematic example of a channel table stored in the electronic device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programming units, such as programming gate arrays or processors. The module described herein may be implemented as either software and/or hardware module and may be stored in any type of computer-readable medium or other computer storage device.

Figure 1:
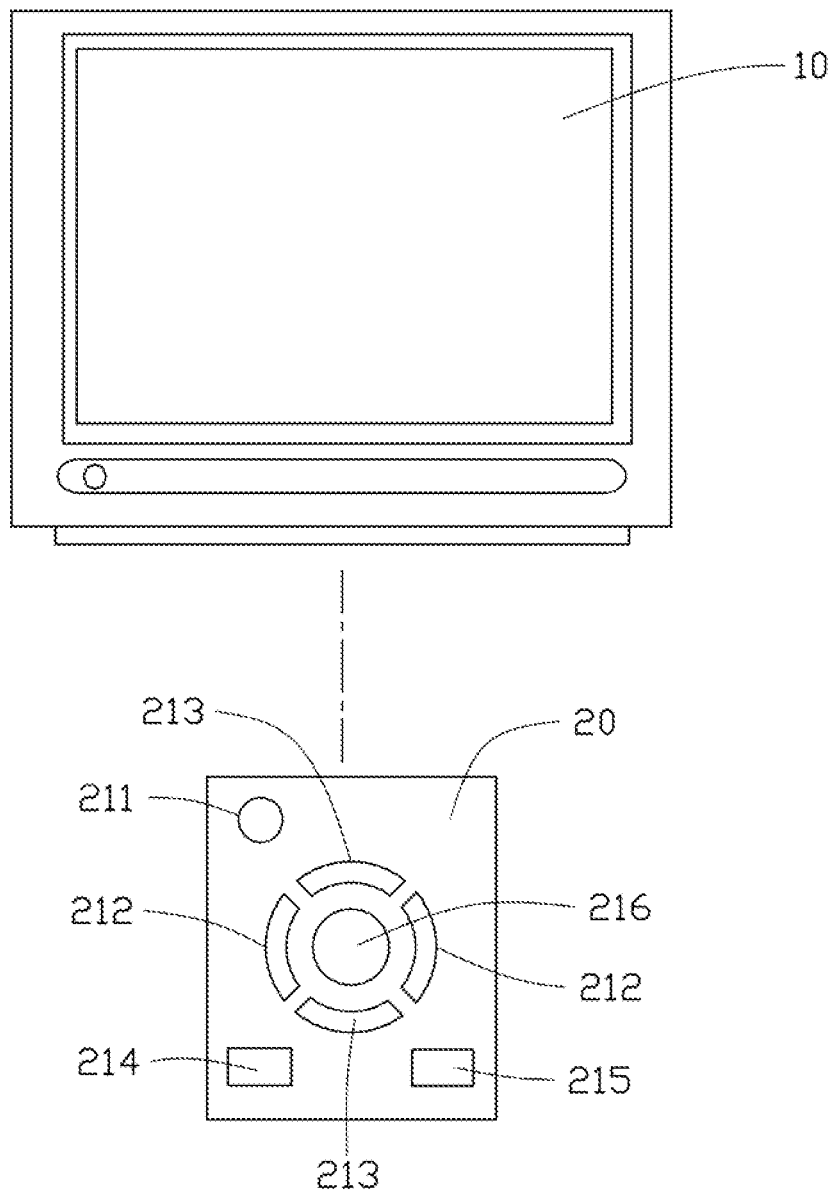
FIG. 1 is a schematic diagram of an electronic device communicating with a television.

FIG. 1 is a schematic diagram of an electronic device 20 communicating with a television 10. The electronic device 20 communicates with the television 10 by a wireless protocol, such as an infrared remote communication. The television 10 may receive a channel code from the electronic device 20 and display a corresponding TV channel. As shown in FIG. 3, each channel code has one corresponding channel.

The electronic device 20 may operates in a normal mode and a predetermined channel mode. The normal mode is a default mode of the electronic device 20. At first, the electronic device 20 executes a full scan of all available channels of the television 10 and stores channel codes of the received channels to the channel table.

Figure 2:
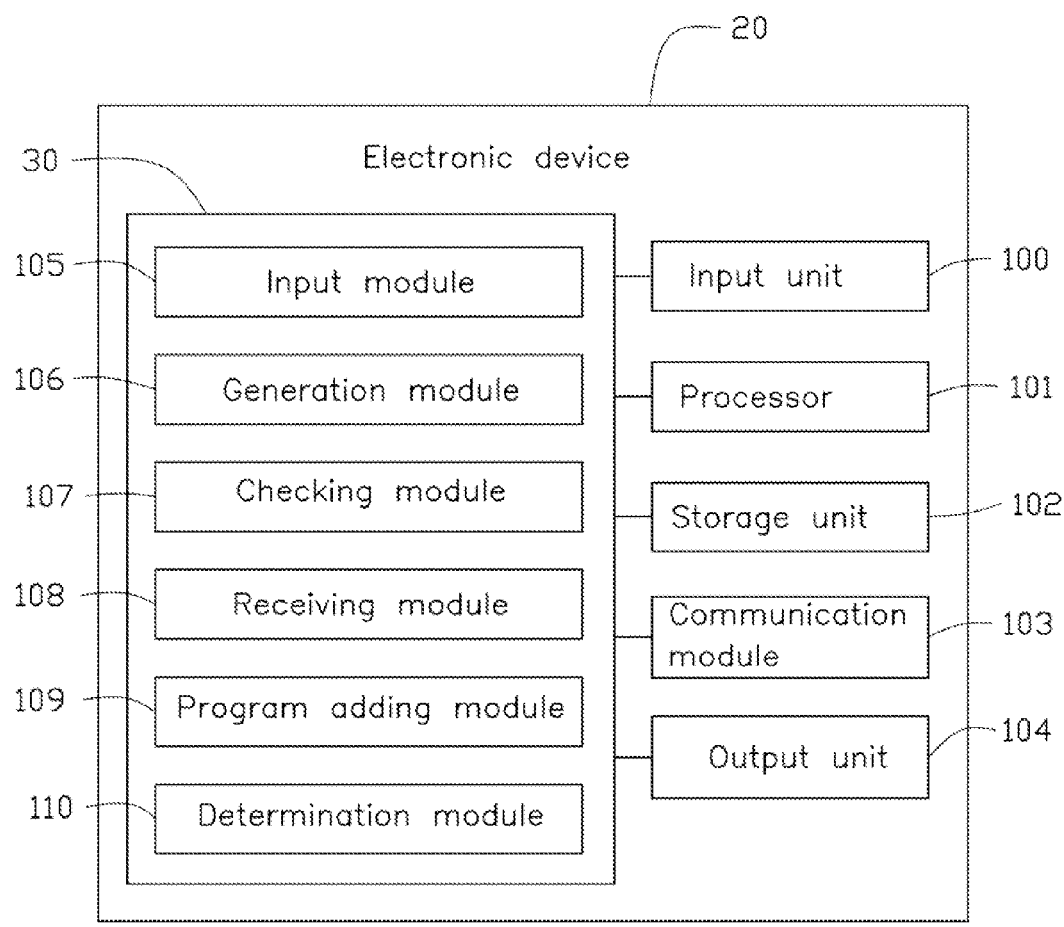
FIG. 2 is a block diagram of one embodiment of the electronic device of FIG. 1.

FIG. 2 is a block diagram of one embodiment of the electronic device 20 of FIG. 1. The electronic device 20 includes an input unit 100, at least one processor 101, a storage unit 102, a communication module 103, an output unit 104, and a management system 30.

The storage unit 102 is electronically connected to the management system 30, the input unit 100, the processor 101, the communication module 103 and the output unit 104. The storage unit 102 further stores an operating system of the electronic device 20. In addition, the storage unit 102 is operable to store data such as computerized code of the management system 30 and the information of the channel table of the electronic device 20. The storage unit 102 may include a hard disk drive, flash memory, RAM, ROM, cache, or external storage media.

As shown in FIG. 1, the input unit 100 of the electronic device 20 includes a plurality of keys and is operable to receive input from users. In some embodiments, the input unit 100 includes a power key 211, a volume key set 212, a channel key set 213, a reset key 215, a mode switch key 214 and a selection key 216. The volume key set 212 includes a volume up key "+" and a volume down key "−". The channel key set 213 includes a channel up key "+" and a channel down key "−". The mode switch key 214 is operable to switch between the normal mode and the predetermined channel mode.

The communication module 103 is operable to receive and transfer the channel codes between the electronic device 20 and the television 10. In some embodiments, the communication module 103 may transfer the channel code from the electronic device 20 to the television 10 to change an active channel of the television 10. The active channel is a channel being displayed by the television 10. In other embodiments, the receiving module 108 may receive the channel code of the active channel from the television 10.

The output unit 104 is operable to output the active channel or the information of the active channel on the television. In addition, the output unit 104 is operable to output a confirmation message upon adding the active channel to the channel table. The output unit 104 may be a display screen or a speaker. Accordingly, the message may be a text message or an audio message.

The management system 30 including an input module 105, a generation module 106, a checking module 107, a receiving module 108, a channel adding module 109 and a determination module 110. The modules 105-110 may comprise computerized code in the form of one or more programs that are stored in the storage unit 102. The computerized code includes instructions that are executed by the at least one processor 101 to provide functions for modules 105-110 of the management system 30.

The input module 105 is operable to receive at least one input from the input unit 100 and to generate at least one corresponding input signal. The input module 105 assigns a corresponding identification to each key on the electronic device 20. For example, the input module 105 assigns "1", "2", "3" and "4" to the volume up key "+", the volume down key "−", the channel up key "+" and the channel down key "−", respectively.

The generation module 106 is operable to generate a corresponding code according to the input signal from the input module 105. The generation module 106 sets a time threshold to receive the corresponding input signal. For example, the generation module 106 sets the time threshold to be 5 seconds. If the corresponding input signal of volume up key "+", the volume down key "−", the channel up key "+" and the channel down key "−" are received within 5 seconds, the generation module 106 input module 105 generates the corresponding channel code "1234."

The checking module 107 is operable to determine whether the operating mode of the electronic device 20 is in the predetermined channel mode. In addition, the checking module 107 is operable to determine whether the corresponding channel code is stored in the channel table upon the condition that the operating mode of the electronic device 20 is in the predetermined channel mode.

Upon the condition that the corresponding channel code is stored in the channel table, the determination module 110 transfers the corresponding channel code to the television 10 by the communication module 103. The television 10 then changes the active channel according to the corresponding channel code.

Upon the condition that the corresponding channel code is not stored in the channel table, the determination module 110 sends an alert notification indicative of a channel addition to the output unit 104. In addition, the receiving module 108 is operable to receive the channel code of the active channel from the television 10 and the channel adding module 109 is operable to add the channel code to the channel table.

Figure 4:
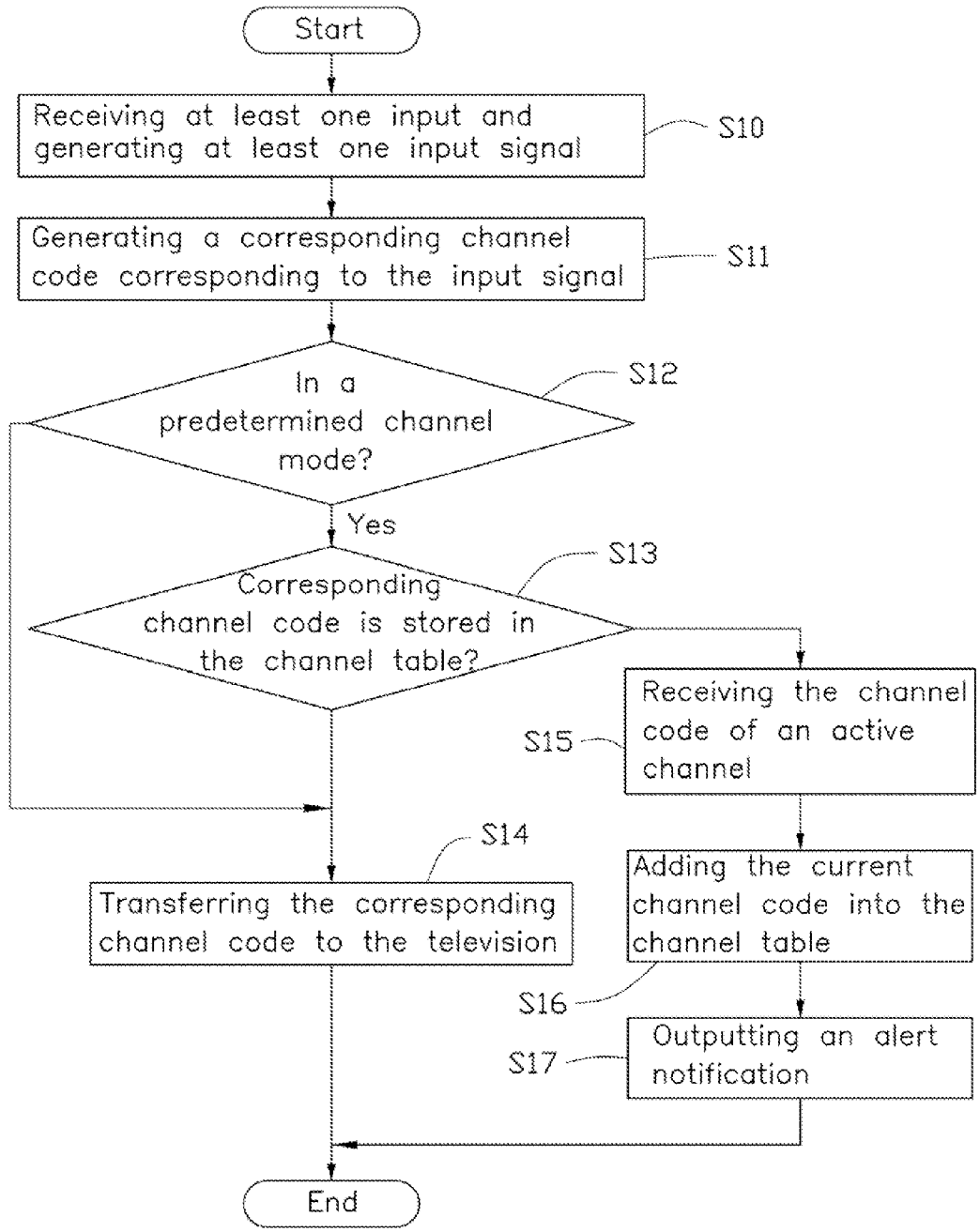
FIG. 4 is a flowchart of one embodiment of a method of managing channels using the electronic device.

FIG. 4 is a flowchart of one embodiment of a method of electronic device channel management. Depending on the embodiment, additional blocks may be added, others deleted, and the ordering of the blocks may be changed.

In block S10, the input module 105 receives at least one input from the input unit 100 and generates at least one corresponding input signal.

In block S11, the generation module 106 generates a corresponding channel code according to the input signal from the input module 105.

In block S12, the checking module 107 determines whether the electronic device 20 is in the predetermined channel mode. If the electronic device 20 is in the predetermined channel mode, in block 13, the checking module 107 determines whether the corresponding channel code is stored in a channel table. If the corresponding channel code is stored in the channel table, in block S14, the determination module 110 transfers the corresponding channel code to the television 10 to change the active channel.

If the corresponding channel code is not stored in the channel table, in block S15, the receiving module 108 receives the channel code the active channel from the television 10.

In block S16, the channel adding module 109 adds the channel code to the channel table.

In block S17, the output unit 104 outputs the alert notification indicative of a channel addition. The output unit 104 may be a speaker or a display screen, for example, and the message may be a text message or a voice message.

Although certain inventive embodiments of the present disclosure have been specifically described, the present disclosure is not to be construed as limited thereto. Various changes or modifications may be made to the present disclosure without departing from the scope and spirit of the present disclosure.

What is claimed is:

1. A method of channel management by an electronic device, the electronic device comprising an input unit and a storage unit storing a channel table, the method comprising:
   receiving at least one input from the input unit to generate at least one input signal;
   generating a corresponding channel code according to the input signal;
   determining whether the electronic device is in a predetermined channel mode;
   determining whether the corresponding channel code is stored in the channel table upon the condition that the electronic device is in the predetermined channel mode;
   transferring the corresponding channel code to the television by the communication module upon the condition that the corresponding channel code is in the channel table, for allowing the television to change the active channel according to the corresponding channel code;
   receiving the channel code of an active channel displayed in the television upon the condition that the corresponding channel code is not stored in the predetermined channel information table; and
   adding the channel code of the active channel into the channel table.

2. The method of claim 1, further comprising:
   outputting an alert notification indicative of adding the channel code of the active channel to the channel table.

3. An electronic device for channel management for communicating with a television, comprising:
   an input unit for receiving input from users, the input unit adapted to switch the electronic device in a normal mode to store a full scan of all available channels and a predetermined channel mode to store at least one channel table corresponding to a channel code;
   an input module receiving at least two inputs from the input unit to generate at least two input signals;
   a generation module receiving the at least two input signals to generate a corresponding channel code;
   a determination module obtaining the corresponding channel table according to the channel code for controlling the television to display a channel of the channel table selected by users when the electronic device is in the predetermined channel mode and the channel table is stored in the predetermined channel mode;
   a receiving module receiving the channel code of an active channel displayed in the television upon the condition that the corresponding channel code is not stored in the channel table; and
   a channel adding module adding the channel code of the active channel into the channel table upon receiving the channel code of the active channel.

4. The electronic device of claim 3, further comprises an output unit outputting an alert notification indicative of adding the channel code of the active channel to the channel table.

5. The electronic device of claim 3, wherein the output unit is a display screen or a speaker.

6. The electronic device of claim 3, further comprises a checking module determining whether the electronic device is in the predetermined channel mode and the corresponding channel code is stored in the channel table.

7. The electronic device of claim 3, wherein the input unit comprises a volume key set, a channel key set and a mode switch key.

8. A non-transitory storage medium having stored thereon instructions that, when executed by a processor, causes the processor to perform a method of channel management by an electronic device, the method comprising:
   receiving at least two inputs from a volume key set and a channel key set to generate at least two input signals;
   generating a corresponding channel code according to the at least two input signals;
   determining whether the electronic device is in a predetermined channel mode;
   determining whether the corresponding channel code is stored in the channel table upon the condition that the electronic device is in the predetermined channel mode; and
   obtaining the corresponding channel table according to the channel code, and controlling the television to display a channel of the channel table selected by users when the electronic device is in the predetermined channel mode and the channel code stored the channel table.

9. The non-transitory storage medium of claim 8, wherein the method further comprising:

receiving the channel code of an active channel displayed by the television upon the condition that the corresponding channel code is not stored in the predetermined channel information table; and adding the channel code of the active channel into the channel table.

10. The non-transitory storage medium of claim 8, wherein the method further comprising:

outputting an alert notification indicative of adding the channel code of the active channel to the channel table.

* * * * *